United States Patent [19]
Weevers

[11] Patent Number: 4,892,287
[45] Date of Patent: Jan. 9, 1990

[54] VALVE BODY WITH A HOUSING HAVING A CYLINDRICAL FLOW PASSAGE

[75] Inventor: Henri H. Weevers, Gouda, Netherlands

[73] Assignee: Mokveld Valves B.V., Gouda, Netherlands

[21] Appl. No.: 245,800

[22] Filed: Sep. 16, 1988

[30] Foreign Application Priority Data

Sep. 18, 1987 [DE] Fed. Rep. of Germany ....... 3731349

[51] Int. Cl.⁴ .............................................. G16K 25/00
[52] U.S. Cl. .................................... 251/172; 251/175; 251/190
[58] Field of Search ............... 251/170, 172, 173, 174, 251/175, 186, 190

[56] References Cited

U.S. PATENT DOCUMENTS

| | | | |
|---|---|---|---|
| 3,497,177 | 2/1970 | Hulsey | 251/172 |
| 3,504,884 | 4/1970 | Mokveld | 251/172 |
| 3,612,483 | 10/1971 | Pool | 251/315 X |
| 4,508,315 | 4/1985 | Livorsi et al. | 251/174 X |

*Primary Examiner*—John Fox
*Attorney, Agent, or Firm*—W. G. Fasse; D. H. Kane, Jr.

[57] ABSTRACT

A valve piston (1) is axially movably arranged in a valve housing (8) having a cylindrical flow passage. A circumferential groove (2) of the piston (1) carries a sealing ring (3) for separating a high pressure side (H) from a low pressure side (L) of the valve. The sealing ring (3) has a cross-sectionally trapezoid shaped portion (4) of which the narrow side (3a) may be pressed tightly to seal against the inner valve seat surface (8') of the housing (8). At least one spring ring (7) is arranged to radially outwardly bias the sealing ring (3) for sealing against the valve seat surface (8').

8 Claims, 4 Drawing Sheets

VALVE BODY WITH A HOUSING HAVING A CYLINDRICAL FLOW PASSAGE

FIELD OF THE INVENTION

The invention relates to a valve body with a housing having a cylindrical flow passage and a valve piston axially movable within the housing.

DESCRIPTION OF THE PRIOR ART

Valves of the above defined general type typically have a circumferential groove in the valve piston with a sealing ring having a trapezoidal cross-sectional shape arranged in the circumferential groove. The shorter parallel side of the trapezoid shape of the sealing ring can be pressed against a housing seat surface to seal the valve. A groove chamber which is bounded by the rear side or radially inner wall of the seal ring communicated through a channel with the high pressure side of the valve.

A valve of this type is known from the German Patent Publication No. (DE-PS) 1,775,748, corresponding to U.S. Pat. No. 3,504,884 as a piston sleeve valve. Even under extremely high pressures applied to only one side of the valve, on the one hand the valve is to achieve an effective sealing in the shut-off position and on the other hand, it should be easily switchable from the shut-off or closed position to the open position, as often as desired, without any danger of so-called seizing or fretting under full pressure. During closing the valve, any danger of damaging the seal is to be avoided. In order to achieve these purposes, a second sealing ring is provided in the rearward groove chamber. The second sealing ring is made of a material having an elasticity greater than that of the material of the first sealing ring. The second sealing ring is clamped between the first sealing ring and the groove floor. The rearward groove chamber communicates through a second channel with the low pressure side of the piston. Thus, the two connecting channels which respectively lead to the high pressure side and the low pressure side of the piston, are separated from one another by the second sealing ring.

Thus, in the above described known valve, the second sealing ring must perform its own further sealing function separately or independently from the sealing function of the first sealing ring. However, because the second sealing ring is explicitly made of a material having a greater elasticity than that of the material of the first sealing ring, the second sealing ring is, by itself, less well suited to resist high temperatures. If the second sealing ring then loses its elasticity, due to the effects of high temperatures, its capability of holding the first sealing ring in its closed or shut-off position is correspondingly reduced. Another more basic function of the second sealing ring, namely to guide or transfer the first sealing ring into the closed or shut-off position, may even be impaired as well.

OBJECTS OF THE INVENTION

In view of the foregoing it is the aim of the invention to achieve the following objects singly or in combination:

to construct a piston sleeve valve which can achieve an effective sealing in the closed position under extreme mechanical conditions, especially conditions of one-sided high pressure loading and even when operating under high temperature conditions;

to construct such a valve body so that it may easily and for a great number of repetitions be switched from the closed position to the opened position without any danger of seizing or fretting;

to construct such a valve body so that damage to the seal during closing of the valve is substantially prevented;

to achieve these objects in a piston sleeve valve without requiring a second sealing ring; and to provide a spring ring which is not sensitive to temperature in such a piston sleeve valve body for biasing the sealing ring to achieve an effective seal.

SUMMARY OF THE INVENTION

The above objects have been achieved in a piston sleeve valve according to the invention having a valve piston axially movably arranged in a cylindrical valve housing and a trapezoid cross-sectional sealing ring arranged in a circumferential groove of the piston. A groove chamber or annular space bounded by the radially inner wall of the sealing ring is connected through a channel to a high pressure side of the valve. At least one spring ring is arranged to press against a portion of the sealing ring so as to radially bias the sealing ring.

The spring ring provided according to the invention is relatively insensitive to high operating temperatures, and biases the sealing ring radially outwardly under any operating conditions. In the operating position the spring ring presses the outer short parallel side of the trapezoidal cross-sectional shape of the sealing ring against the inner wall or valve seat surface of the cylindrical sleeve forming the flow passage of the valve. The spring ring achieves a corresponding high surface pressure of the sealing ring against the valve seat surface, thereby causing a reliable seal. Thus, a second sealing ring made of an especially elastic material is not absolutely necessary in order to achieve a sealing effect which is sufficient under high temperature and pressure operating conditions.

According to an especially advantageous embodiment of the invention, a groove is provided on each of the two sides of the sealing ring, such groove receiving a spring ring which protrudes laterally beyond the sealing ring.

In this embodiment the spring ring facing away from the high pressure side of the seal has two effects. First, the spring ring causes a radially outwardly directed displacement of the sealing ring, thereby improving the sealing effect. Second, the spring ring also causes an axially and downwardly directed pressing of the sealing ring against the floor or bottom of the circumferential groove in the movable piston, thereby further improving the sealing effect. This improved sealing effect is achieved because the sealing ring is axially displaced by the high pressure away from the high pressure side. Under the effect of increasing axial displacement of the sealing ring, the spring ring is pressed further and further into its respective ring groove in the sealing ring. Each spring ring in the respective groove of the sealing ring, has an outwardly opening cross-sectional wedge shape. This wedge shape of the spring ring makes sure, in response to the displacement of the spring ring deeper into the ring groove of the sealing ring, that the sealing ring is firmly pressed with its foot against the bottom or floor of the circumferential groove in the axially movable piston. The lower end of the sealing ring has a dovetailed configuration which further enhances the sealing effect.

According to a further embodiment of the invention, at least one spring ring comprising a coil spring is embedded in, or enclosed by a supplemental or auxiliary ring, which radially outwardly contacts the radially inner wall of the sealing ring, and which radially inwardly contacts the floor of the circumferential groove. In this embodiment, the sealing ring has a trapezoidal cross-sectional shape with no dovetail-shaped base. The supplemental or auxiliary ring is made of a material which is more elastic than the material of the sealing ring.

In the just mentioned embodiment the spring ring, which is constructed as a coil spring, ensures that the sealing ring is biassed radially outwardly so that the shorter parallel side of the trapezoidal shape of the sealing ring is pressed into effective sealing contact against the inner wall or seat surface of the cylindrical flow passage. However, the supplemental ring is relieved of this displacement or biassing function and instead only has the function of sealing the area between the backside or radially inner sie of the sealing ring and the floor of the circumferential or annular groove. Because the biassing function is served by the spring ring, the supplemental ring can safely be made of a material which is more elastic than the material of the seal ring. Hence, the supplemental ring will still effectively achieve the sealing function, even at high temperatures which would otherwise impair the supplemental rings radial biassing force to such an extent that it alone could not effectively radially outwardly bias or displace the sealing ring.

According to a further embodiment of the invention, the supplemental ring is assembled from two separate ring halves. Each ring half is constructed as a closed or endless shape, whereby the ring halves are arranged at an axial spacing from one another.

In this embodiment the two supplemental ring halves surround and enclose, in the manner of a shell an annular chamber. The spring ring, which is constructed as a coil spring is located in the annular chamber. Edge portions of the two supplemental ring halves facing each other form sealing lips or edge portions. The sealing lip or edge portion of the supplemental ring half facing the high pressure side of the valve is pressed by the pressurized fluid more or less against the lip or edge portion of the other supplemental ring half and against the force of the coil spring, but a sufficient free space remains so that pressurized fluid can enter the annular chamber between the supplemental halves, in which chamber the coil spring is located. The pressurized fluid in the annular chamber then applies an outward expanding force onto the ring half on the supplemental low pressure side of the valve whereby this low pressure ring half is pressed against the longer parallel side of the trapezoidal sealing ring. The other low pressure ring half is pressed against the floor of the circumferential groove in the piston. These supplemental ring halves effectively form sealing lips or seals and prevent any passage or throughflow of the pressure medium from the high pressure side to the low pressure side around the back or radially inner wall of the sealing ring. Furthermore, the sealing ring is tightly pressed against the inner wall or seat surface of the cylindrical flow passage sleeve by the radially outward force of the coil spring, whereby the sealing effect of the sealing ring against the valve seat area is ensured.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
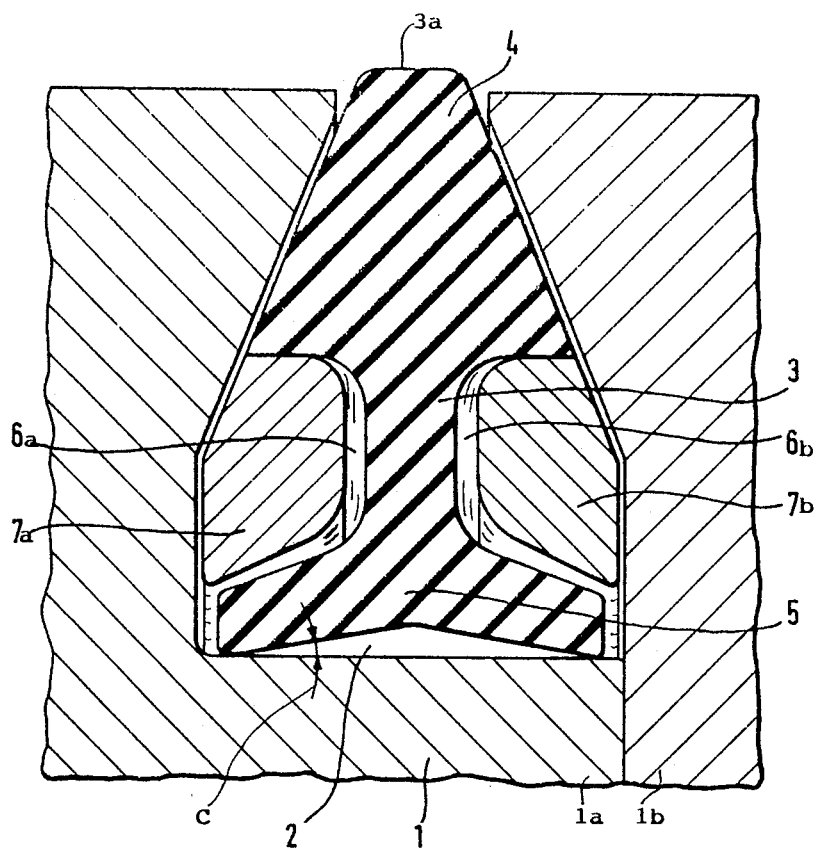
FIG. 1 is a section through a portion of a valve piston according to the invention, wherein the valve axis extends horizontally, showing a sealing ring having a trapezoidally shaped cross-sectional portion and a dovetail-shaped cross-sectional portion, both shown in a non-stressed condition.
Figure 2:
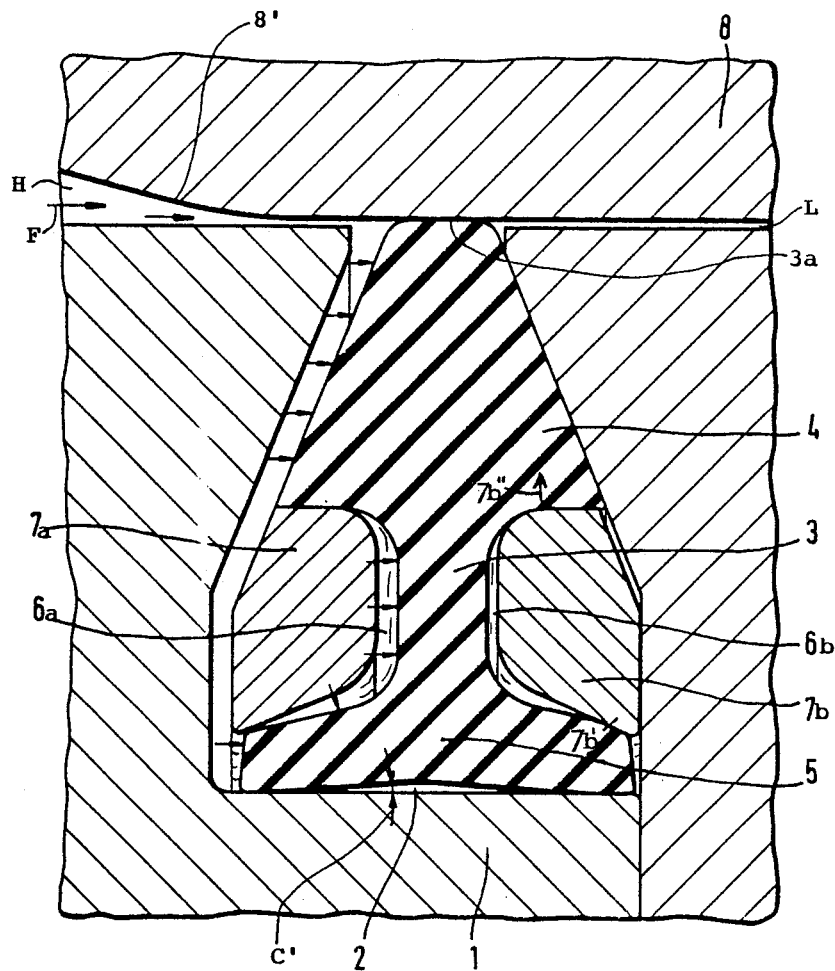
FIG. 2 is a partial sectional view of the valve piston shown in FIG. 1, installed in a valve sleeve or housing, whereby the sealing ring is shown in a stressed valve closing position.

In the example embodiment shown in FIGS. 1 and 2, a valve piston 1 having a horizontally extending axis, is axially movable to the left or to the right in FIG. 1. A sealing ring 3 is arranged in a circumferential groove 2 which extends around the circumference of the piston 1. The piston 1 is preferably assembled from two parts 1a and 1b a shown, to simplify the machining of the groove 2 and to facilitate the mounting of the sealing means including the sealing ring 3 having a cross-sectionally trapezoid-shaped section 4 and a cross-sectionally dovetail-shaped portion 5. The dovetail portion 5 contacts the floor of the circumferential groove 2 along two edges when the seal is not stressed as shown in FIG. 1, whereby a clearance angle C and an annular chamber are formed. Between the two portions 4 and 5 of the sealing ring 3, two axially open grooves 6a and 6b are formed in the sealing ring. These grooves 6a and 6b open axially outwardly along each side of the sealing ring 3. A spring ring 7a or 7b is set into each axially open groove 6a or 6b respectively. Each spring ring 7a, 7b has a cross-sectional shape adapted to the cross-sectional-shape of the groove 6a or 6b. Each spring ring 7a and 7b is set into the corresponding groove 6a or 6b in such a manner that it protrudes partially outside the corresponding side surfaces of the portions 4 and 5 of the sealing ring 3. The radially inner portion of each spring ring is wedge-shaped, whereby the spring ring directly participating in the sealing function wedges itself into a sealing position 7b' shown in FIG. 2.

As shown in FIG. 2, the above described piston 1 is inserted into a cylindrical housing 8 or valve sleeve so that the spring rings 7a, 7b press the sealing ring 3 radially outwardly, that is vertically upwardly, against the radially inner wall or valve seat surface 8' of the cylindrical housing 8. Due to the radially inwardly directed compression of the sealing ring 3, the dovetail-shaped portion 5 flexes elastically so that the clearance angle relative to the floor of the circumferential groove 2 is reduced to the angle C', whereby the elastic deformation of the dovetail portion 5 serves to tightly press the sealing ring 3 against the valve seat surface 8'. Thus, the high pressure side H to the left of the sealing ring 3 is effectively sealed or shut-off from the low pressure side L to the right of the sealing ring 3.

Referring further to FIG. 2, fluid F under pressure is effective on the sealing ring 3 in the direction shown by the horizontal arrows representing the fluid F in FIG. 2, thereby axially displacing the sealing ring 3 toward the right or toward the low pressure side L. The spring ring 7b on the low pressure side is pushed further into the correspondingly shaped groove 6b, whereby a wedge action applies a further increased radially outwardly directed force 7b on the trapezoidal portion 4 of the sealing ring 3 so that the short parallel side 3a of the sealing ring 3 is pressed even more tightly radially outwardly against the valve seat surface 8' of the housing 8. Simultaneously, the low pressure side spring ring 7b applies a wedging force at 7b' to press the dovetail portion 5 of the sealing ring 3 radially inwardly more tightly against the floor of the circumferential groove 2 to achieve the reduced clearance angle C' so that the high pressure side H is effectively sealed from the low pressure side L at the dovetail-shaped end 5 of the sealing ring 3 as well as at the narrow face 3a of the sealing ring 3.

Figure 3:
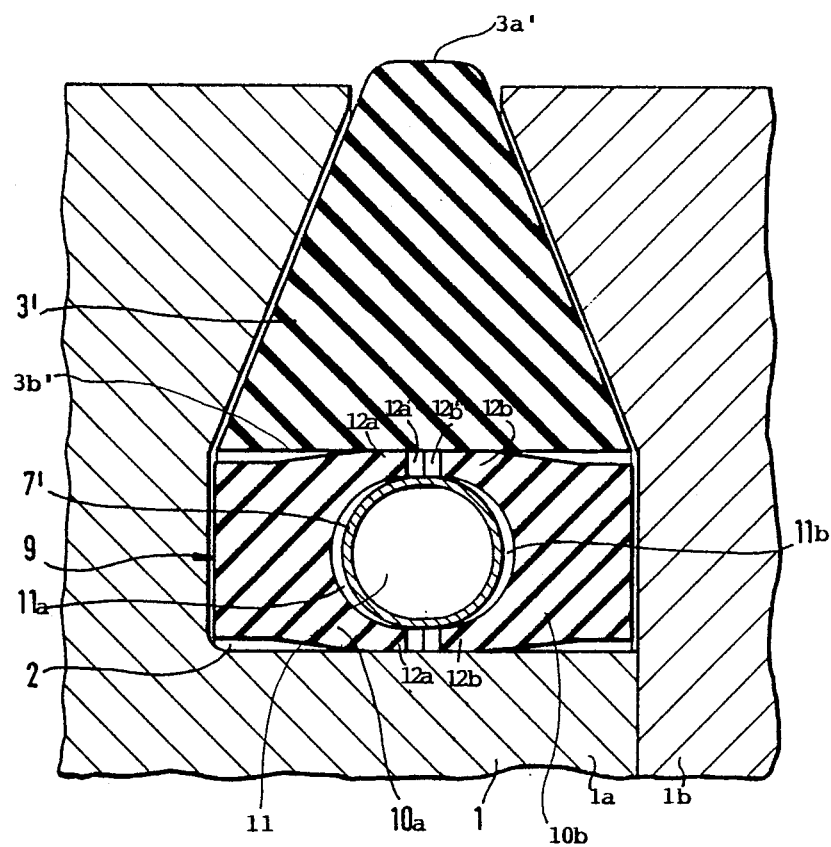
FIG. 3 is a partial sectional view similar to that of FIG. 1, but showing a second embodiment with a sealing ring which has a trapezoidal cross-sectional shape and with a supplemental ring having of two ring halves.

According to the example embodiment shown in FIG. 3, a valve piston body 1 is similarly constructed as in the embodiment of FIG. 1 and may also be assembled from two piston members 1a and 1b for the same reasons as stated above. A sealing ring 3' having a trapezoidal cross-sectional shape is arranged in a circumferential groove 2 of the piston 1. A supplemental or auxiliary ring 9 is arranged between the long base side 3b' of the trapezoid-shaped sealing ring 3' and the floor of the circumferential groove 2. The supplemental ring 9 comprises two ring halves 10a and 10b each of which is a ring body. Each ring half 10a or 10b has a groove or recess 11a or 11b respectively to form an annular chamber 11 which encloses a spring ring 7' in the form of a coil spring.

Figure 4:
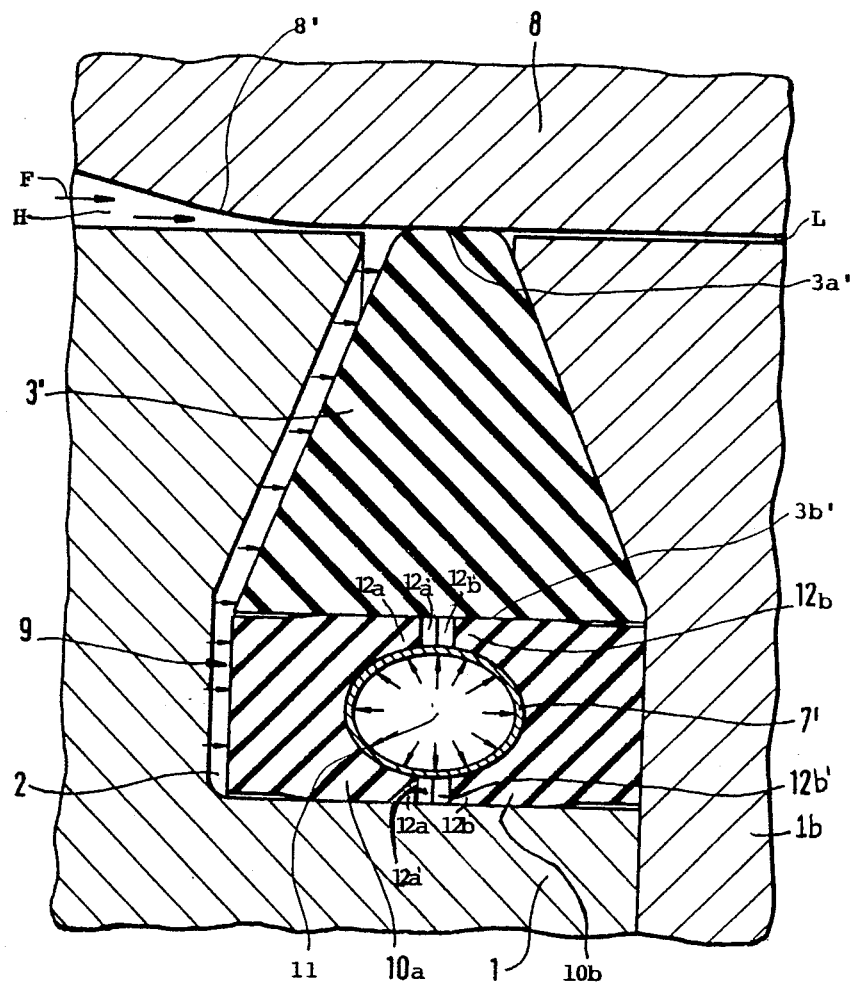
FIG. 4 is a view similar to that of FIG. 2, but showing the valve piston embodiment of FIG. 3 in its stressed valve closing state.

As shown in FIG. 4, illustrating the sealing state of the valve the piston 1 according to FIG. 3 is inserted into a cylindrical valve housing 8, whereby the sealing ring 3' is pressed radially inwardly by the valve seat surface 8' against the force of the spring ring 7' which tends to press the sealing ring 3' radially outwardly. Thus, the short face or narrow edge 3a' of the sealing ring 3' effectively seals against the valve seat surface 8' to shut-off or seal the high pressure side H of the valve from the low pressure side L of the valve.

The fluid F under pressure flowing in the direction of the arrows representing the fluid F in FIG. 4 impinges upon the sealing ring 3' and the supplemental ring 9 tending to push both to the right. Thus, the sealing ring 3' as well as the supplemental ring 9 are displaced laterally or axially to the right or toward the low pressure side L. Furthermore, the pressurized fluid F can enter the annular chamber 11 through grooves 12a' and 12b', by pushing an edge portion 12a of the high pressure side supplemental ring half 10a against the force of the coil spring 7' thereby pressurizing the annular chamber 11. The resulting fluid pressure in the annular chamber 11 presses the edge portions or sealing lips 12b of the low pressure ring half 10b tightly against the large surface 3b' of the sealing ring 3' and against the floor of the circumferential groove 2, respectively. As a result, the narrow side or edge 3a' of the sealing ring 3' is more tightly pressed against the valve seat surface 8' and simultaneously the area between the inner large surface 3b' of the sealing ring 3' and the floor of the circumferential ring 2 is effectively sealed by the sealing lips 12b. Thus, the sealing ring 3' and the supplemental ring 9 simultaneously cooperate to achieve a hermetically sealed separation between the high pressure side H and the low pressure side L of the valve housing 8. In both embodiments a radial plane centrally through the sealing ring divides the sealing structure into two portions which are mirror-symmetrical to each other. The sealing structure retains its mirror-symmetry in the valve open state as shown in FIGS. 1 and 3, and in the valve closed state as shown in FIGS. 2 and 4, whereby wear and tear is minimized and the valve can be opened and closed many times without any danger of seizing or fretting.

Although the invention has been described with reference to specific example embodiments, it will be appreciated, that it is intended to cover all modifications and equivalents within the scope of the appended claims.

What I claim is:

1. A valve having a longitudinal axis, comprising a housing having a cylindrical flow passage and a valve seat surface surrounding said flow passage between a high pressure side and a low pressure side, a valve piston axially movable in said housing and having a circumferential groove, sealing ring means arranged in said circumferential groove, said sealing ring means having a radially inner axially extending surface in said circumferential groove and a radially outer axially extending surface for cooperation with said valve seat surface, and spring ring means arranged in said circumferential groove for radially biasing said sealing ring means to press said radially outer surface of said sealing ring means radially outwardly against said valve seat surface, and channel means between said sealing ring means and a wall of said groove in said valve piston for exposing surfaces at least of said sealing ring means facing said high pressure side, to high pressure, said sealing ring means and said spring ring means having a mirror-symmetrical construction relative to a radial plane extending centrally through said valve perpendicularly to said longitudinal axis, said sealing ring means and said spring ring means retaining said mirror-symmetrical construction in a valve open condition and substantially in a valve closed condition to reduce wear and tear.

2. The valve of claim 1, wherein at least one portion of said sealing ring means has a trapezoidal cross-sectional shape, whereby said radially outer surface and said radially inner surface form the parallel sides of said trapezoidal shape, said radially outer surface being axially shorter than said radially inner surface.

3. The valve of claim 1, wherein said sealing ring means comprises an annular groove on each of two sides of said sealing ring means, whereby said annular groove has a tapering cross-section becoming outwardly wider, and wherein said spring ring means comprise one spring ring arranged in each of said annular grooves, said spring rings protruding from the respective annular groove beyond the respective side of said sealing ring means.

4. The valve of claim 1, further comprising supplemental ring means arranged in said circumferential groove of said valve piston to radially outwardly contact said radially inner surface of said sealing ring means and to radially inwardly contact a floor of said circumferential groove.

5. The valve of claim 4, wherein said spring ring means is embedded centrally in said supplemental ring means.

6. The valve of claim 4, wherein said spring ring means comprises a coil spring located in a central annular chamber of said supplemental ring means.

7. The valve of claim 4, wherein said sealing ring means is made of a first material having a first elasticity, and said supplemental ring means is made of a second material having a second elasticity, said second elasticity being greater than said first elasticity.

8. The valve of claim 4, wherein said supplemental ring means comprises two ring halves each forming a closed loop, each of said loops having a ring groove therein, said ring grooves facing each other axially to form an annular chamber between said two ring halves, said spring ring means being received in said annular chamber, and passage means for admitting fluid under pressure into said annular chamber.

* * * * *